March 5, 1957     J. V. WISEMAN     2,784,056
METHOD OF PROCESSING SEARLES LAKE BRINE
Filed Feb. 16, 1953
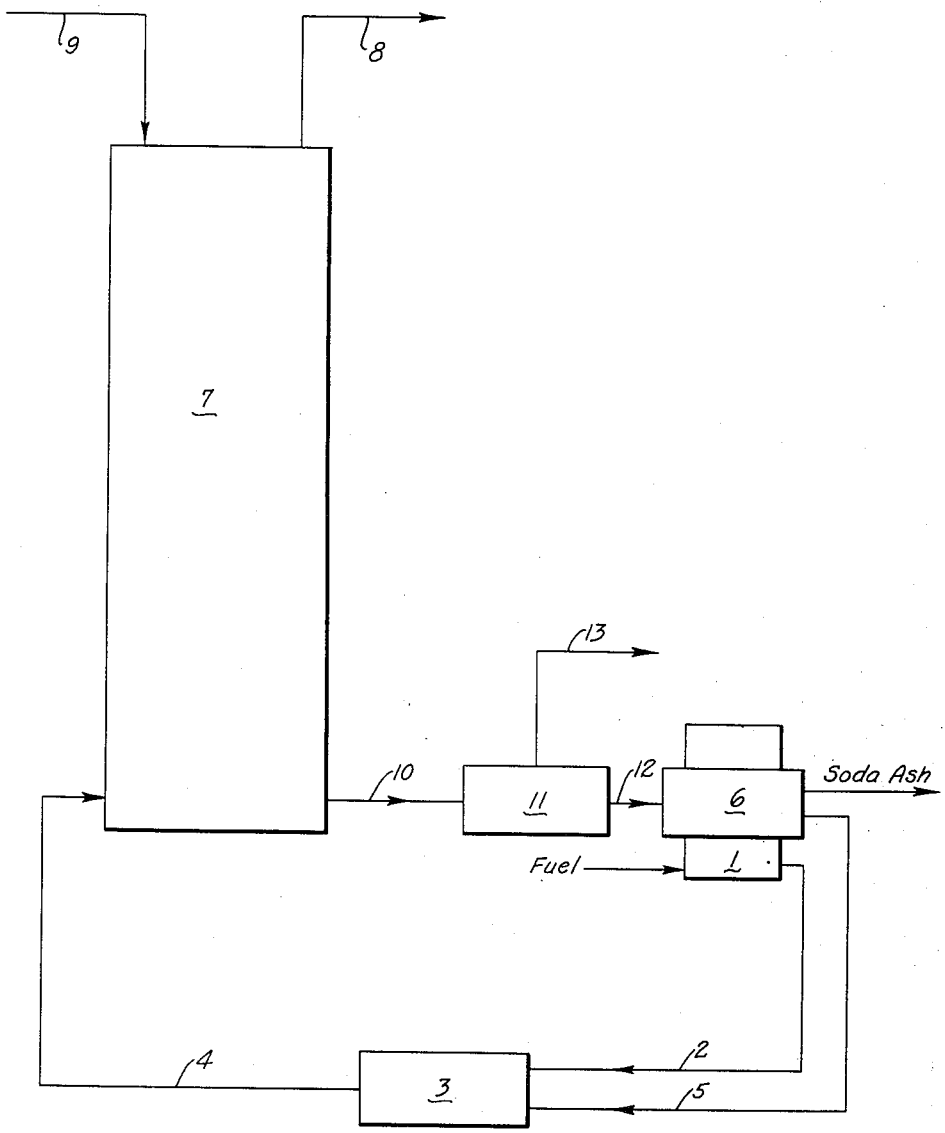
INVENTOR.
James V. Wiseman
ECKHOFF & SLICK, Attys.
BY
A member of the firm 2,784,056
Patented Mar. 5, 1957

2,784,056

METHOD OF PROCESSING SEARLES LAKE BRINE

James V. Wiseman, Westend, Calif., assignor to Stauffer Chemical Company, a corporation of Delaware Application February 16, 1953, Serial No. 337,009

4 Claims. (Cl. 23—39)

This invention relates to the treatment of a complex brine such as that found at Searles Lake, California, to recover valuable constituents therefrom. As is well known, the brine of this lake contains many valuable constituents such as sodium carbonate, sodium bicarbonate, sodium sulphate, potassium chloride and borax.

The brine from the lake has been extensively exploited and various methods are known and have been proposed for recovering the valuable constituents from this brine. Suitable methods of recovery of the brine are set forth in Hellmers Patents 1,756,122 and 1,733,537. According to these patents, sodium bicarbonate is first precipitated from the brine by carbonating the brine and borax is subsequently recovered from the brine.

The original brine recovered from the lake did not contain any appreciable percentage of sulfides but, as brines were brought from deeper parts of the lake, sulfides, and in particular sodium sulphide were encountered in amounts of from 0.05 to an excess of 0.3% by weight.

The Hellmers process was used for many years and gave very satisfactory results. The carbonating gas used was carbon dioxide obtained from the calcination of lime rock and contained about 39% carbon dioxide. However, as brines were encountered having an appreciable sulfide content, the results were not fully satisfactory since hydrogen sulfide was released throughout the carbonation and even during the subsequent borax recovery. Further, the source of carbon dioxide was expensive and it was desired to use a less expensive source of $CO_2$, such as flue gas.

Various proposals have been made for alleviating the sulfide difficulty and for employing a cheaper source of carbon dioxide, such as that set forth in the Blackmun Patent 2,567,867. According to this process, the brine was first treated with a gas containing carbon dioxide, such as flue gas, to convert the sodium sulfide to hydrogen sulfide and to sweep the latter from the brine. However, it was necessary to avoid the slightest precipitation of sodium bicarbonate during the treatment with flue gas, since extremely fine, sharp crystals were precipitated; when the brine containing these crystals was further carbonated, the crystals served as seed resulting in a very small needle-shaped crystal in the final carbonation product. This undesirable type of crystal was wet, slushy and thus difficult to filter. When filtered, the crystals contained about 35% adhering moisture, making it difficult to dry and calcine the bicarbonate.

On the other hand, the original Hellmers' process had resulted in rather spherical crystals with blunt terminations formed in clusters or rosettes. Such crystals may be filtered readily and contain about 18% moisture and are free running when dry. Further, the precarbonation with flue gas was not fully effective and hydrogen sulfide was evolved during the further carbonation and even during the borax recovery step and became a serious nuisance.

In processing the sodium bicarbonate recovered, it is customary to calcine the sodium bicarbonate to sodium carbonate. This produces some carbon dioxide, but not a sufficient quantity to serve as the sole source of carbon dioxide when operating in accordance with the Hellmers patents noted above. Thus, it has heretofore been necessary to provide an auxiliary, rich source of carbon dioxide, such as by burning limestone.

It is therefore an object of the present invention to provide a method for treating Searles Lake brine with a relatively inexpensive source of carbon dioxide, such as slightly enriched flue gas.

Another object of this invention is to provide a method of carbonating Searles Lake brine to remove hydrogen sulphide therefrom during the carbonation step, so that it will not evolve during the borax recovery step.

A further object of this invention is to provide a method of carbonating Searles Lake brine wherein the carbonation is effected with flue gas from processing the sodium bicarbonate and is enriched with gas from the calcination of sodium bicarbonate produced in a subsequent stage of the process, so that the process does not depend upon an external source of carbon dioxide, and is thus self-sufficient.

Still another object of this invention is to provide a method of recovering sodium bicarbonate from the Searles Lake brine wherein the crystals recovered are relatively large with blunt terminations, easy to filter, and free running when dry.

In general, the objects of the present invention are accomplished by carbonating the brine with gas containing less carbon dioxide than has heretofore been thought necessary, at an elevated pressure, and with a carefully controlled correlation between the carbon dioxide percentage and the pressure as is hereinafter defined.

According to the present invention, the carbonation of the brine to produce sodium bicarbonate and to free the brine of sulphide is preferably conducted in a single tower. However, the carbonation step may be effected in more than one tower if desired, so that sodium bicarbonate may be taken off in more than one stage.

When using gas of relatively low carbon dioxide content, it has been found necessary to increase the pressure in the carbonation tower to increase the absorption efficiency of the carbon dioxide and to prevent the precipitation of very fine needle-like crystals. It has been found that the pressure selected must be correlated with the percentage of carbon dioxide in such a manner that the carbon dioxide will have a partial absolute pressure of at least 8 p. s. i.

Surprisingly enough, it has been found that there is an abrupt change in the type of crystals formed as the partial absolute pressure of carbon dioxide is varied around 8 p. s. i. When carbonating Searles Lake brine at a pressure of 37 p. s. i. g. inlet pressure, the crystals formed were of the fine, needle-like type when the percentage of carbon dioxide was 15%, but when the carbon dioxide percentage was increased to 16%, the crystals were of the blunt type and easy to filter. Since in these tests, the atmospheric pressure was 13.8 p. s. i., the absolute pressure was 50.8 p. s. i. Thus, 15% carbon dioxide represents a partial pressure of 7.6 and 16% carbon dioxide represents a pressure of 8.13 p. s. i.

Although the pressures and carbon dioxide percentages can be varied over rather wide limits, so long as the partial pressure of the carbon dioxide is 8 p. s. i. or more, certain practical considerations prevent one from going beyond certain rather narrow limits. Thus, as the carbon dioxide percentage is reduced, one must pump at higher pressures and pump a greater volume of inert gas so the process soon becomes uneconomic. On the other hand, as the carbon dioxide percentage is increased, the efficiency of the sulfide removal falls off and an unduly rich source of carbon dioxide is required. Further, it is not desirable to operate at pressures much below about 25 p. s. i. g., as the carbon dioxide absorption efficiency drops off. For these reasons, it is preferred to operate at carbon dioxide percentages of from 12% to 25%. Within this range, it is preferred to operate at about 16% to 20% carbon dioxide.

It has been found that temperature has substantially no effect on the process at normal operating temperatures of from 20° to 38° C. This is true even when operating at near the critical gas percentages.

The following examples illustrate satisfactory and unsatisfactory conditions of operation:

*Example 1.*—Carbonation at 25 p. s. i. g. and 20% $CO_2$:

| | | |
|---|---|---|
| Discharge temperature | °C | 28 |
| Discharge brine titration (10 ml. with NHCl) | ml | 3.7 |
| Filtered bicarbonate: | | |
| $H_2O$ | percent | 34.8 |
| NaCl | do | .52 |

Filter cake cracked when solution withdrawn. Spiney crystals. Crystal shape unsatisfactory.

*Example 2.*—Carbonation at 25 p. s. i. g. and 22% $CO_2$:

| | | |
|---|---|---|
| Discharge temperature | °C | 20 |
| Discharge brine titration | ml | 4.8 |
| Filtered bicarbonate: | | |
| $H_2O$ | percent | 23.2 |
| NaCl | do | .09 |

Filter cake did not crack. Crystals small blunt ends. Satisfactory.

*Example 3.*—Carbonation at 50 p. s. i. g. and 14% $CO_2$:

| | | |
|---|---|---|
| Discharge temperature | °C | 36 |
| Discharge brine titration | ml | 4.5 |
| Filtered bicarbonate: | | |
| $H_2O$ | percent | 20.4 |
| NaCl | do | .12 |

Crystals filtered easily. Individual crystals large, number of rosettes reduced from normal. Blunt ends on crystals. Satisfactory.

*Example 4.*—Carbonation at 50 p. s. i. g. and 12% $CO_2$:

| | | |
|---|---|---|
| Discharge temperature | °C | 30 |
| Discharge brine titration | ml | 3.0 |
| Filtered bicarbonate: | | |
| $H_2O$ | percent | 24.4 |
| NaCl | do | .20 |

Slight cracking of filter cake when solution withdrawn. Individual crystals large. Terminations of crystals somewhat spiney. Unsatisfactory.

*Example 5.*—Carbonation at 37 p. s. i. g. and 16% $CO_2$:

| | | |
|---|---|---|
| Discharge temperature | °C | 28 |
| Brine alkalinity (10 ml. with NHCl) | ml | 5.4 |
| Filtered bicarbonate: | | |
| $H_2O$ | percent | 21 |
| NaCl | do | .12 |

Crystals with blunt terminations. Satisfactory.

*Example 6.*—Carbonation at 37 p. s. i. g. and 15% $CO_2$:

| | | |
|---|---|---|
| Discharge temperature | °C | 30 |
| Brine alkalinity (10 ml. with NHCl) | ml | 4.2 |
| Filtered bicarbonate: | | |
| $H_2O$ | percent | 30.4 |
| NaCl | do | .58 |

Crystals had spiney terminations. Filter cake cracked. Unsatisfactory.

Each of the above runs was conducted under the following conditions:

A steel column 100 feet high and 16 inches in diameter was set up and fitted with gas dispersing baffles every four feet. The quantity of gas was regulated at about 9 cubic feet per minute per square foot of tower cross-sectional area. This figure was determined as being suitable from previous operations.

To maintain constant pressure and desired liquid level, a controller with an automatic air operated valve was fitted on the discharge of the column. By measuring the pressure of the gas entering the column, and using this to regulate the liquid discharge rate, a constant liquid head was maintained. The system would hold the pressure to ±0.25 pound pressure.

The percentage carbon dioxide desired was maintained by mixing flue gas with carbon dioxide from the calcination of sodium bicarbonate and feeding the gas into the suction of the gas compressor that was operating the carbonating column. This was held to about ±0.5% carbon dioxide.

Brine was fed into the top of the column at a rate to maintain the proper alkalinity (about pH 8) at the discharge of the column. The alkalinity of the brine discharged with the bicarbonate present should be in the range of about pH 7.5 to about pH 8.5 since in this range alkalinity does not affect crystal shape.

To determine what crystal shape was made at certain conditions, the tower was operated a minimum of 12 hours before it was even presumed that an equilibrium had been established. Even then, the crystals were checked for about 12 hours more to make certain no change had occurred during this period.

In the above Examples 2, 3 and 5, the carbon dioxide was supplied in part from flue gas derived from the processing of the sodium bicarbonate having a carbon dioxide content of about 12%. The sodium bicarbonate produced was calcined to sodium carbonate and the carbon dioxide so produced was more than sufficient to maintain the process. Thus, the process of the present invention is operative with no external source of carbon dioxide. Runs similar to Examples 5 and 6 have been made in columns having diameters of 5 feet and 11 feet with the same results.

In the figure of the drawing forming a part of this specification, there is shown a diagrammatic representation of the equipment used in performing the present invention. In the drawing, flue gas containing about 12% carbon dioxide, from a source 1 is brought through line 2 to compressors 3. The gas is compressed to a suitable pressure, as hereinbefore specified, and is mixed with carbon dioxide introduced through line 5 and passed to the tower 7 by line 4. The carbon dioxide introduced through line 5 is obtained from the calciner 6, which calcines sodium bicarbonate from the process.

The carbonation tower 7 is a gas-liquid contact column and may contain perforated plates, bubble cap plates, saddles or other suitable contact or dispersion means. The tower 7 has a line 8 at the top for discharging the spent carbonation gas which contains hydrogen sulfide and a line 9 for introducing raw brine. A line 10 is provided for withdrawing the carbonated brine which passes to a separator 11. The separator 11 separates the solid and liquid phases of the carbonated brine and discharges the sodium bicarbonate through line 12 to the calciner 6 and the brine through line 13.

I claim:

1. A process for the carbonation of raw Searles Lake brine whereby there is obtained crystals of sodium bicarbonate therefrom, said crystals being large, easily filtrable and having blunt terminations, the process comprising passing a gas containing from 12% to 25% carbon dioxide through the raw lake brine at a temperature of from 20° to 38° C. at a pressure such that the carbon dioxide has a partial pressure of at least 8 p. s. i. a. to precipitate sodium bicarbonate therefrom and recovering said sodium bicarbonate.

2. The process of claim 1 wherein the gas contains from 16% to 20% carbon dioxide.

3. The process of claim 1 wherein the raw Searles Lake brine contains at least 0.02% sulfides as sodium sulfide.

4. A continuous process for the carbonation of raw Searles Lake brine whereby there is obtained from said brine crystals of sodium bicarbonate, said crystals being large, easily filtrable, and having blunt terminations, said process comprising passing through the brine at a temperature of from 20° to 38° C. flue gas enriched with carbon dioxide, said enriched flue gas containing from 12% to 25% carbon dioxide at a pressure such that the carbon dioxide has a partial pressure of at least 8 p. s. i. a., whereby sodium bicarbonate is precipitated from the brine, recovering said sodium bicarbonate, calcining at least a portion of the sodium bicarbonate to produce sodium carbonate and carbon dioxide and using the carbon dioxide so produced as the sole source of enrichment for the flue gas.

References Cited in the file of this patent
UNITED STATES PATENTS

| | | |
|---|---|---|
| 1,618,834 | Kuhnert | Feb. 22, 1927 |
| 1,674,474 | Kuhnert | June 19, 1928 |
| 1,751,132 | Cummings | Mar. 18, 1930 |
| 1,865,832 | Chesny | July 5, 1932 |
| 1,865,833 | Chesny | July 5, 1932 |
| 2,256,962 | Reich | Sept. 23, 1941 |
| 2,567,867 | Blackmun | Sept. 11, 1951 |
| 2,626,852 | Byrns | Jan. 27, 1953 |
| 2,675,297 | Gray et al. | Apr. 13, 1954 |